United States Patent
Fernandez-de-Castro

(10) Patent No.: US 8,422,177 B2
(45) Date of Patent: Apr. 16, 2013

(54) READER SHIELD WITH TILTED MAGNETIZATION

(75) Inventor: Juan Jose Fernandez-de-Castro, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 237 days.

(21) Appl. No.: 12/771,490

(22) Filed: Apr. 30, 2010

(65) Prior Publication Data
US 2011/0267720 A1 Nov. 3, 2011

(51) Int. Cl.
*G11B 5/33* (2006.01)
(52) U.S. Cl.
USPC .......................................................... 360/319
(58) Field of Classification Search .................. 360/319
See application file for complete search history.

(56) References Cited

U.S. PATENT DOCUMENTS

| | | | |
|---|---|---|---|
| 3,848,217 A * | 11/1974 | Lazzari | 338/32 R |
| 5,666,246 A * | 9/1997 | Gill et al. | 360/327.23 |
| 5,750,270 A | 5/1998 | Tang et al. | |
| 6,018,443 A * | 1/2000 | Watanabe et al. | 360/319 |
| 6,087,027 A | 7/2000 | Hoshiya et al. | |
| 6,128,160 A | 10/2000 | Yamamoto | |
| 6,462,897 B1 | 10/2002 | Yamamoto | |
| 6,477,018 B1 | 11/2002 | Terunuma | |
| 6,500,570 B2 | 12/2002 | Hasegawa et al. | |
| 6,775,108 B2 | 8/2004 | Kief et al. | |
| 6,894,878 B1 | 5/2005 | Cross | |
| 6,936,353 B1 | 8/2005 | Wu et al. | |
| 7,196,871 B2 | 3/2007 | Hsu et al. | |
| 7,282,278 B1 | 10/2007 | Nolan | |
| 7,314,675 B1 | 1/2008 | Nolan | |
| 7,379,277 B2 | 5/2008 | Burbank et al. | |
| 7,408,742 B2 | 8/2008 | Kameyama | |
| 7,408,746 B2 | 8/2008 | Sato | |
| 7,440,230 B2 | 10/2008 | Hsu et al. | |
| 7,468,214 B2 | 12/2008 | Lu et al. | |
| 7,556,871 B2 | 7/2009 | Ichihara et al. | |
| 2007/0002502 A1 * | 1/2007 | Burbank et al. | 360/319 |
| 2007/0009766 A1 | 1/2007 | Lu et al. | |
| 2007/0127165 A1 | 6/2007 | Kanaya et al. | |
| 2007/0146930 A1 | 6/2007 | Hsu et al. | |
| 2007/0217081 A1 * | 9/2007 | Macken | 360/319 |
| 2008/0003354 A1 | 1/2008 | Nolan | |
| 2008/0068760 A1 | 3/2008 | Suk | |
| 2008/0094059 A1 | 4/2008 | Sasaki et al. | |
| 2008/0180858 A1 | 7/2008 | Ota et al. | |
| 2008/0247087 A1 | 10/2008 | Otani et al. | |
| 2009/0188891 A1 | 7/2009 | Tanaka et al. | |
| 2009/0197121 A1 | 8/2009 | Inturi et al. | |
| 2010/0067148 A1 * | 3/2010 | Tsuchiya et al. | 360/245.3 |

OTHER PUBLICATIONS

NN7409967, "Magnetoresistive Read Heads", IBM TDB, v. 17, No. 4, pp. 967-968, Sep. 1974.*

(Continued)

*Primary Examiner* — J. A. Watko
(74) *Attorney, Agent, or Firm* — Alan G. Rego; Westman, Champlin & Kelly, P.A.

(57) ABSTRACT

An apparatus that includes a first read shield and a second read shield and a reader stack between the first and second read shields. The first and second read shields each include a tilted magnetization layer closest to the reader stack to control magnetic field flux lines in a free layer of the reader stack and thereby improve a selectivity of the reader to independently sense and isolate media transitions.

13 Claims, 6 Drawing Sheets

OTHER PUBLICATIONS

Shute, Hazel A. et al.: "Analytic Three-Dimensional Response Function of a Double-Shielded Magnetoresistive or Giant Magnetoresistive Perpendicular Head", IEEE Transactions on magnetics, vol. 42, No. 5, May 2006 (9 pages).

Shute, Hazel A. et al.: "A Theoretical Analysis of Shielded Magnetoresistive Heads by Conformal Mapping", IEEE Transactions on Magnetics, vol. 33, No. 1, Jan. 1997 (11 pages).

U.S. Appl. No. 12/771,528, filed Apr. 30, 2010.

* cited by examiner

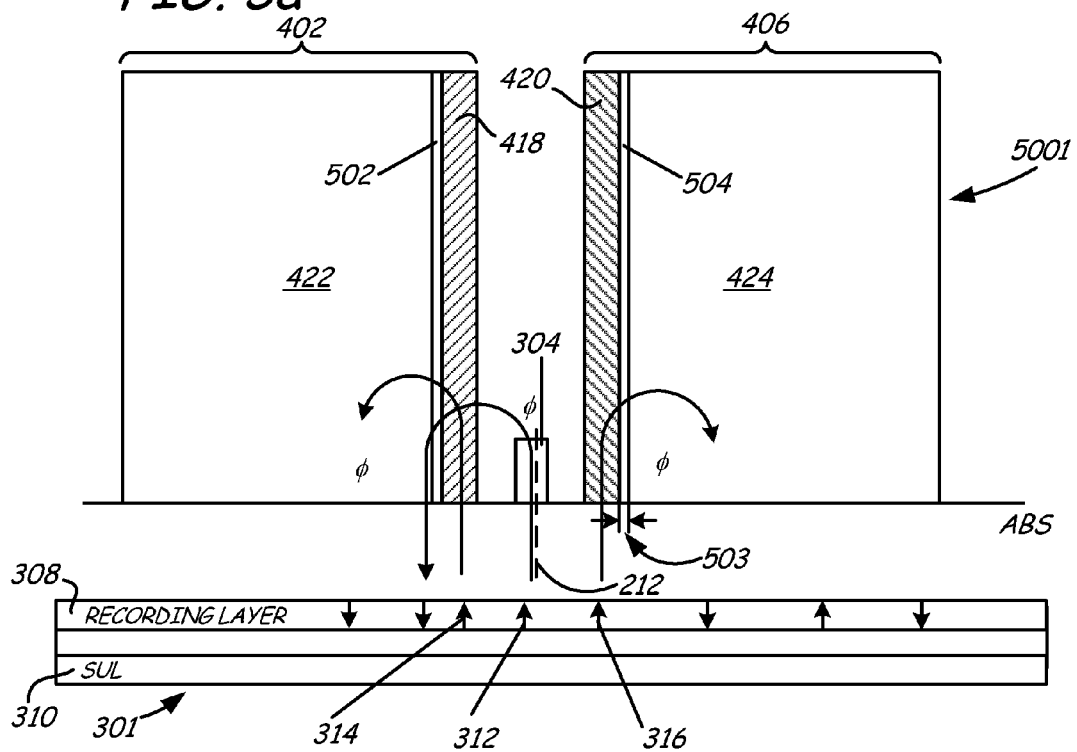
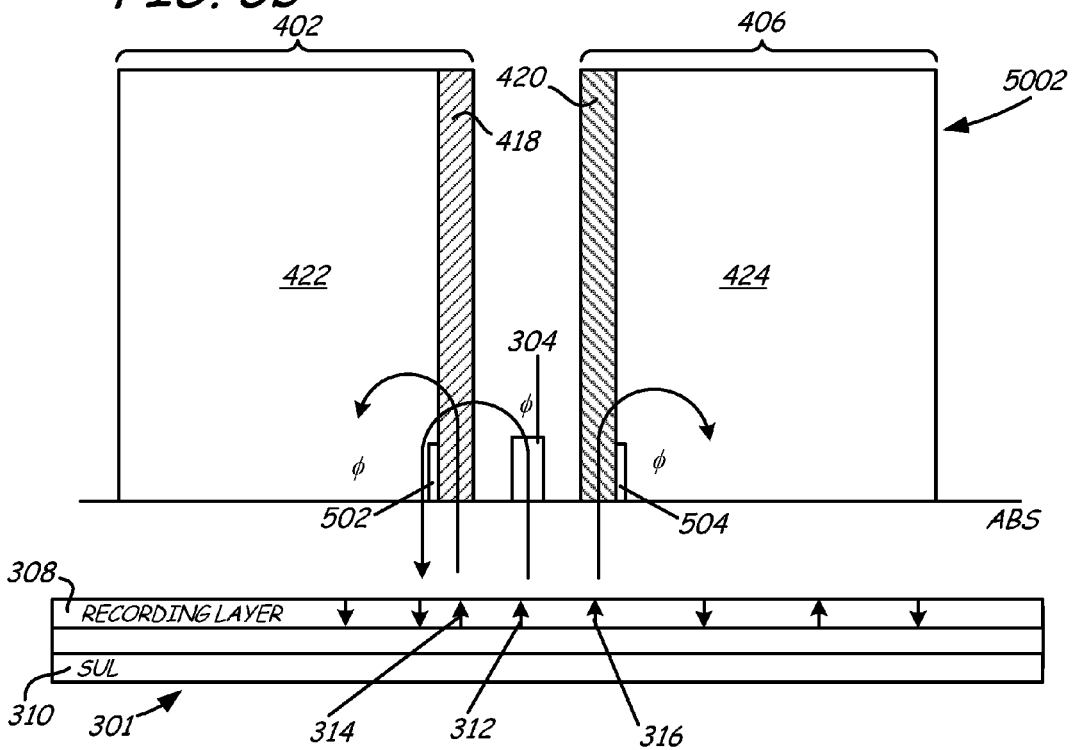

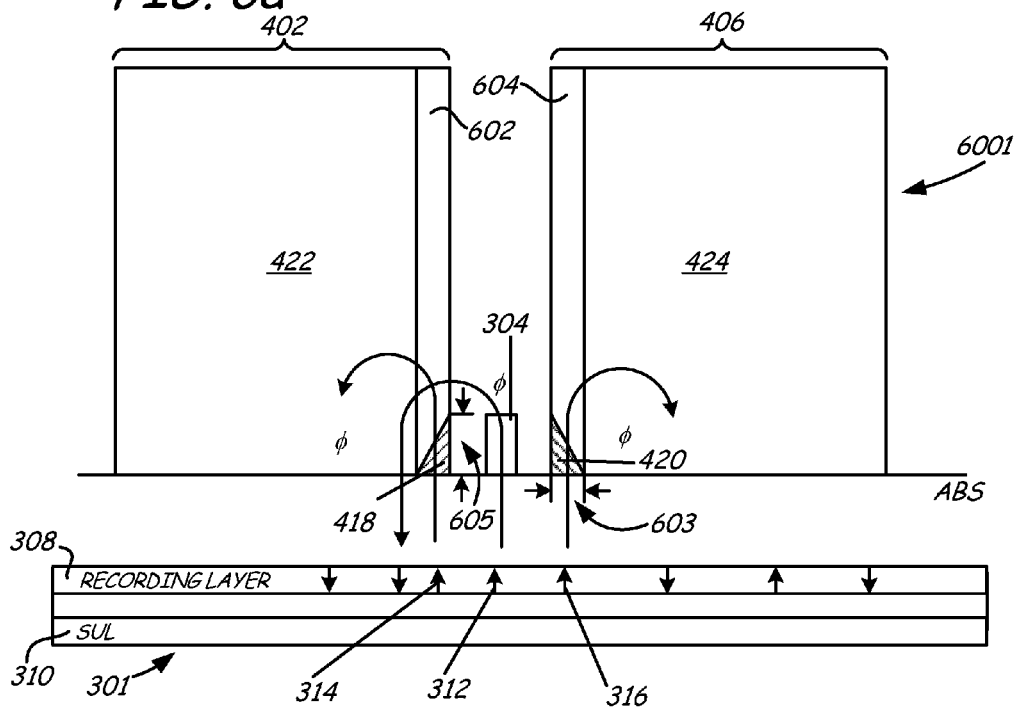
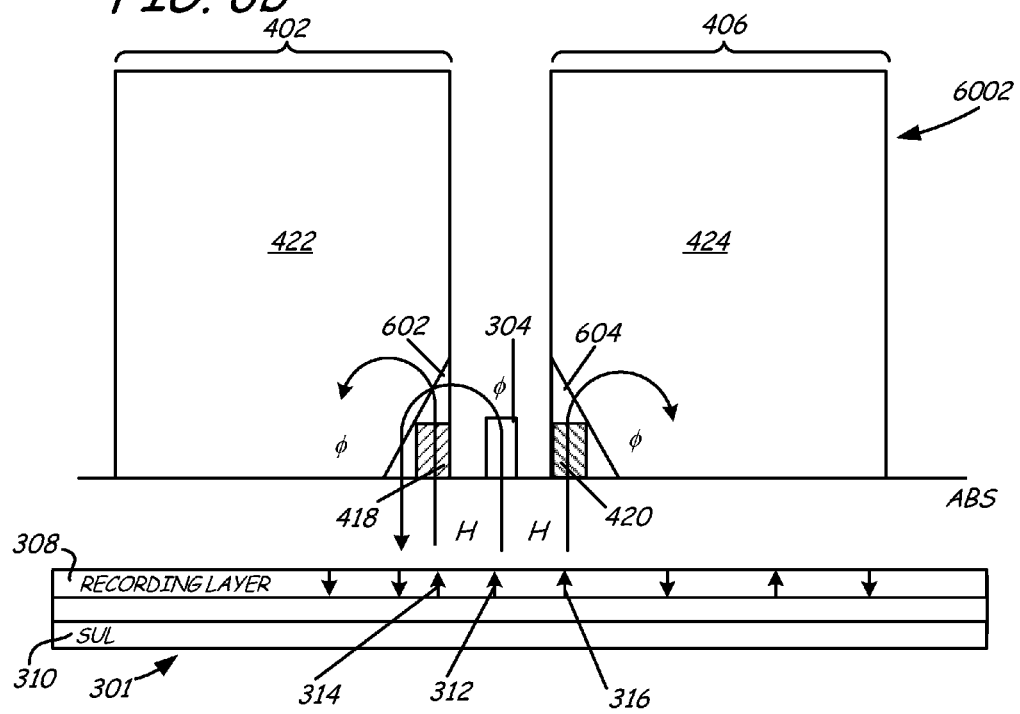

READER SHIELD WITH TILTED MAGNETIZATION

BACKGROUND

In a magnetic data storage and retrieval system, a magnetic recording head typically includes a reader portion, or read head, having a magnetoresistive (MR) sensor for retrieving magnetically encoded information stored on a magnetic medium, such as a magnetic disc. To help ensure that the MR sensor reads only the information that is stored directly beneath it on a specific track of the magnetic disc, magnetic shields are placed on the MR sensor.

As an ever-increasing amount of information is stored on a magnetic medium, it becomes difficult for MR sensors to separately read the stored information without also reading noise and other nearby transitions from adjacent stored information. Thus, as areal densities increase, there has to be a corresponding increase in a sensitivity of the MR sensors and a resolution to separate the transition under the reader from the other transitions.

The present embodiments address at least some of these problems and offer other advantages over the prior art.

SUMMARY

In one embodiment, an apparatus that includes a first read shield and a second read shield and a reader stack between the first and second read shields is provided. In this embodiment, the first and second read shields each include a tilted magnetization layer closest to the reader stack to control a direction of propagation of magnetic flux lines and thereby prevents them from reaching a free layer of the reader stack.

In another embodiment, a method that includes controlling magnetic field flux lines in a free layer of a reader stack by forming a tilted magnetization layer adjacent each of two substantially opposing sides of the reader stack, is provided.

In still another embodiment, a magnetic head having an air bearing surface (ABS) is provided. The magnetic read head includes a magnetoresistive read element. The magnetic read head also includes first and second read shields, each positioned adjacent to, and on substantially opposite sides of, the read element at the air bearing surface. At least a portion of the first and second read shields are magnetized in a direction that is tilted with respect to the ABS.

These and various other features and advantages will become apparent upon reading the following detailed description and upon reviewing the associated drawings.

BRIEF DESCRIPTION OF THE DRAWINGS

FIG. 4b is an oblique view of a tilted magnetization layer of the magnetic read head of FIG. 4a.

FIGS. 5a, 5b, 6a and 6b are cross-sectional views of a magnetic read heads that include shields having tilted magnetization layers.

DETAILED DESCRIPTION

Figure 1:
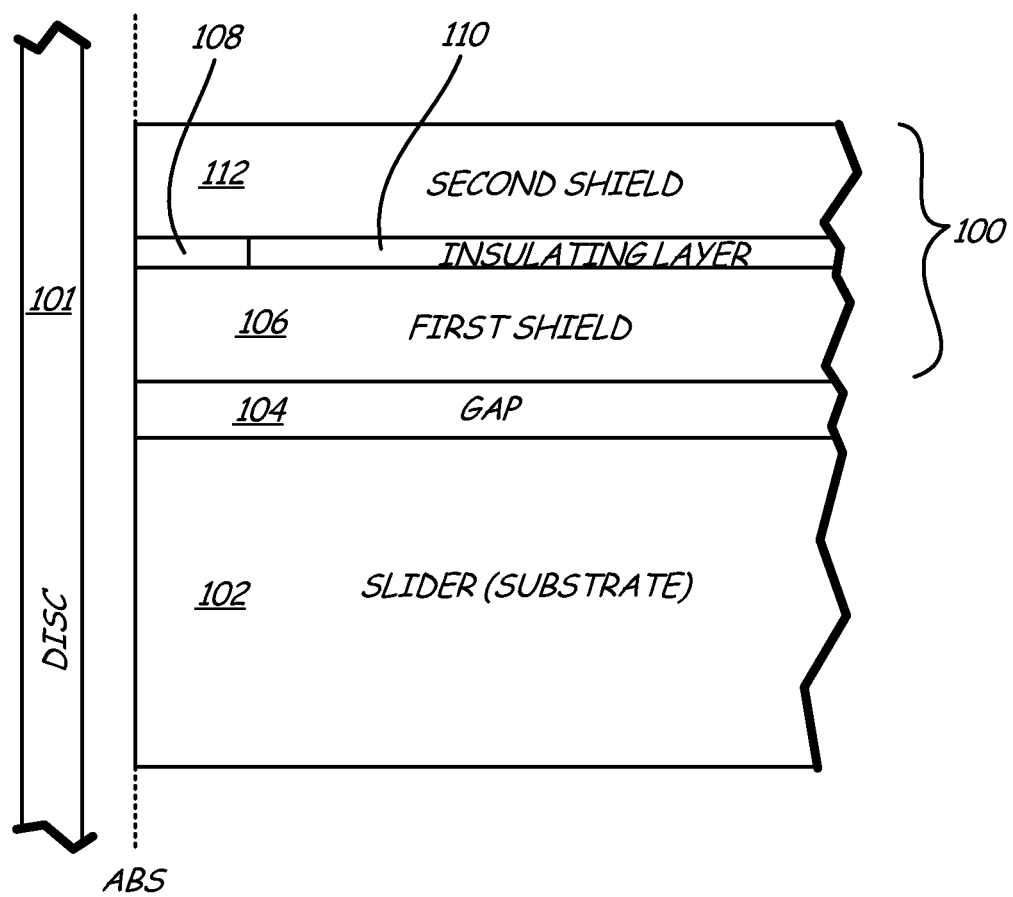
FIG. 1 is a cross-sectional view of magnetic read head and magnetic disc taken along a plane substantially normal to an air bearing surface (ABS) of the magnetic read head.

FIG. 1 is a cross-sectional view of magnetic read head 100 and magnetic disc 101 taken along a plane substantially normal to an air bearing surface (ABS) of magnetic read head 100. As will be described further below, the present embodiments are useful in a magnetic read head such as 100. Magnetic disc 101 may be either a perpendicular or longitudinal recording media, with magnetic read head 100, having in-plane or out of plane applied bias current, corresponding thereto. Magnetic read head 100 is carried on slider body (substrate) 102 and separated therefrom by gap 104. Magnetic read head 100 includes first magnetic shield 106, magnetoresistive (MR) sensor 108, insulating layers 110, and second magnetic shield 112. MR sensor 108 and insulating layers 110 are positioned between first and second shields 106 and 112, with MR sensor 108 being adjacent the ABS of magnetic head 100.

In the embodiment of FIG. 1, to provide current to MR sensor 108, first and second magnetic shields 106 and 112 perform double duty as both magnetic shields and electrodes. Thus, first and second magnetic shields 106 and 112 serve the dual functions of providing electrical connection to MR sensor 108 and providing magnetic shielding from stray magnetic fields. As will be described below in connection with FIG. 2, in the embodiment of FIG. 1, a sense current flows in a direction perpendicular to the plane of read element 108.

Figure 2:
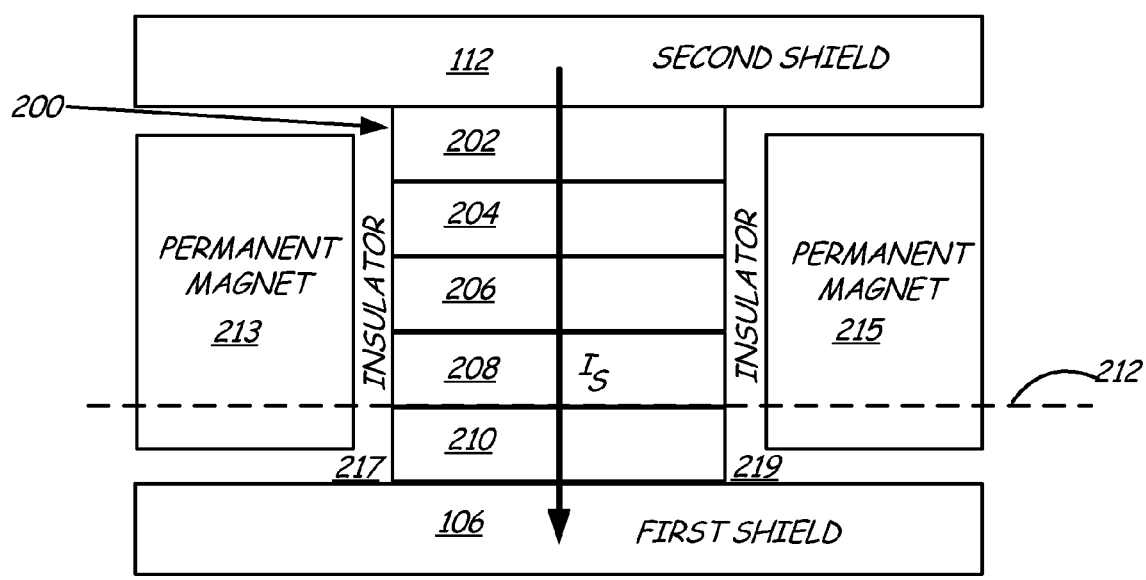
FIG. 2 shows an ABS view of a magnetoresistive (MR) sensor having a MR stack.

FIG. 2 shows an ABS view of a MR sensor comprising MR stack 200, which is a specific embodiment of MR sensor 108. MR stack 200 includes metal cap layer 202, first free layer 204, nonmagnetic layer 206, second free layer 208, and metal seed layer 210. MR stack 210 is positioned between first shield 106 and second shield 112. Permanent magnets 213 and 215, respectively, are included on either side of MR sensor 200 and are separated from MR sensor 200 by insulators 217 and 219, respectively. In other embodiments, the permanent magnets may be situated differently or even excluded. Dashed line 212 represents a plane between layers of MR stack 200.

First shield 106 provides electrical connection to MR stack 200 since seed layer 210, which it contacts, is electrically conductive. Second shield 112 is in contact with cap layer 202 of electrically conductive material and therefore also provides electrical connection to MR stack 200. Thus, first and second shields 106 and 112 provide electrical connections for the flow of the sensing current $I_s$ from a current source (not shown) to the MR stack 200. In MR stack 200, the flow of the sensing current $I_s$ is in a direction perpendicular to the plane (CPP) of the layers of the MR read sensor and experiences a resistance which is proportional to the cosine of an angle formed between the magnetization directions of the two free layers. The voltage across the CPP MR stack is measured to determine the change in resistance and the resulting signal is used to recover the encoded information from the magnetic medium. It should be noted that CPP MR stack 200 configuration is merely illustrative, and other layer configurations for CPP MR stack 200 may be used.

It should be noted that the present embodiments are also useful for current-in-plane (CIP) read heads (not shown) in which the sense current flows in a plane of the read sensor. CIP read heads usually include additional metal contact layers, spacer layers, etc., between the read sensor and the read shields.

Figure 3:
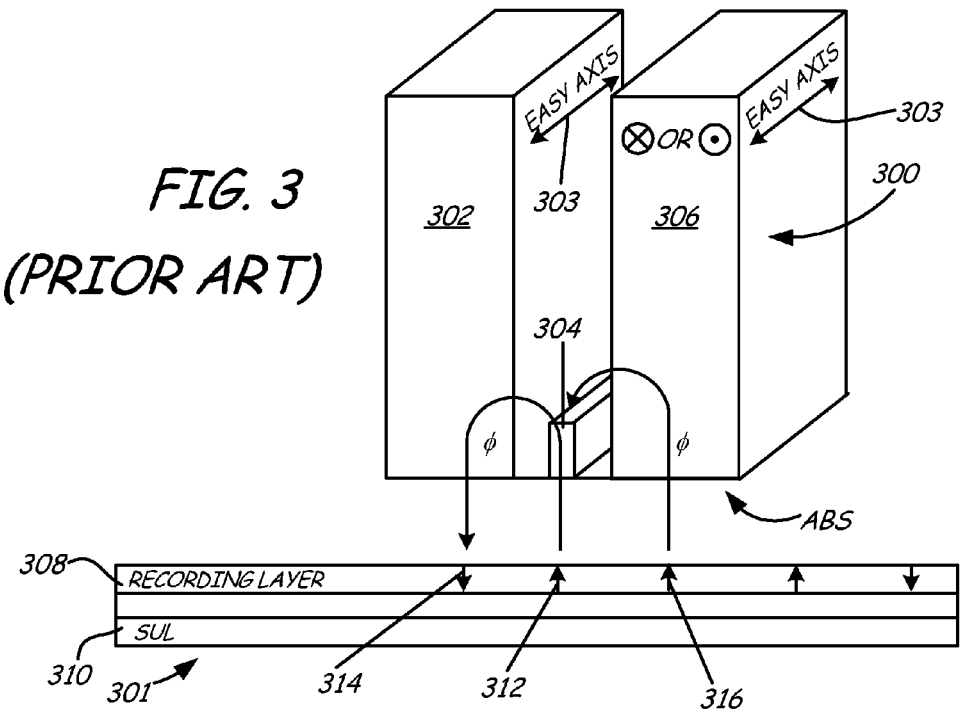
FIG. 3 is a diagrammatic illustration of a magnetic read head.

As noted earlier, as an ever-increasing amount of information is stored on a magnetic medium, it becomes difficult for MR sensors to separately read the stored information without also reading interference from adjacent stored information. FIG. 3 is an oblique view of a conventional magnetic read head 300 with a cross section taken along a plane substantially normal to an ABS of magnetic read head 300. FIG. 3 also shows a cross-sectional view of a magnetic disc 301 taken along the plane substantially normal to the ABS of magnetic read head 300. In the interest of clarity, the cross-sectional views in the different figures are not shaded. Read head 300 includes a first read shield 302, a read sensor 304 and a second read shield 306. In conventional read heads (such as 300), an easy axis 303 of shield magnetization is perpendicular to the plane normal to the ABS and points into or out of the plane normal to the ABS. As can be seen in FIG. 3, disc 301 includes a recording layer 308 and a soft under layer (SUL) 310. Media transitions such as 312, 314 and 316 are shown on recording layer 308. To better illustrate flux lines in read head 300, shields 302 and 306 are shown spaced apart from read sensor 304. As can be seen in FIG. 3, in addition to flux going directly from media transition 312 (the bit to be read) into read sensor 304, there is flux from proximate media transitions (for example, media transition 316) that goes into the reader shields (for example, shield 306) and is magnetically propagated through the shields (for example, shield 306) into the read sensor 304. The difference in sign from these two effects changes a profile of an on-track read sensitivity function.

Flux propagation in shields depends on their permeability, which is a function of a direction of magnetization in the shields near the read sensor. The permeability has a maximum value when the magnetization is perpendicular to the direction of propagation of the flux in the shields. In contrast, the permeability has its minimum value equal to 1 when the flux and the magnetization are in a same direction. Due to an increase in reluctance (resistance to flux propagation) when the permeability is decreased, flux prefers to propagate through lower reluctance paths that have larger permeability. Consequently, magnetization in the shields could be used to control the reader response to a specific part of the field from the media. In conventional read heads (such as 300), when the transition under the reader is being read, relatively strong fields from adjacent transitions can cause the magnetization of the shields to rotate. As described above, this can result in flux from proximate media transitions (for example, media transition 316) going into the reader shields (for example, shield 306) and then into the read sensor (such as 304), which is undesirable.

To address this undesirable effect, in some of the present embodiments, the first and second read shields each include a tilted magnetization layer closest to the reader stack to control the propagation of flux and prevent magnetic field flux lines from reaching the free layer of the reader stack. In the tilted magnetization layer, the magnetization (i.e., the easy axis) is tilted relative to the position shown in FIG. 3. FIGS. 4a, 5a, 5b, 6a and 6b are examples of embodiments with tilted magnetization layers.

Figure 4A:
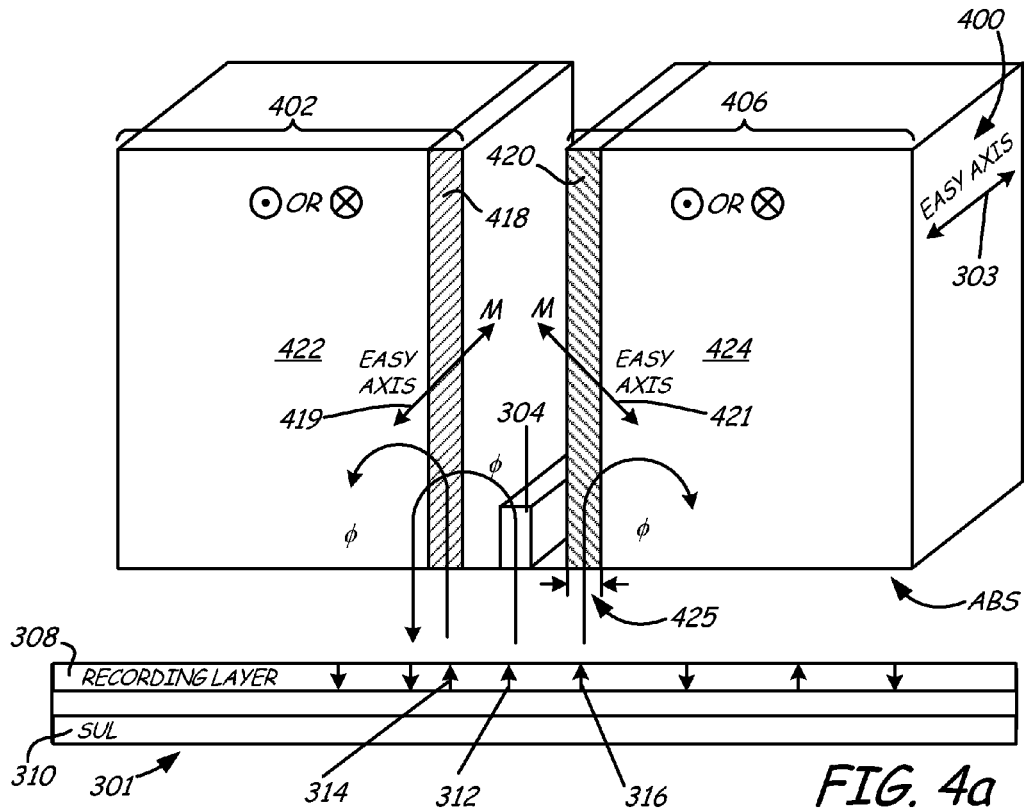
FIG. 4a is a diagrammatic illustration of a magnetic read head in accordance with one embodiment.
Figure 4B:
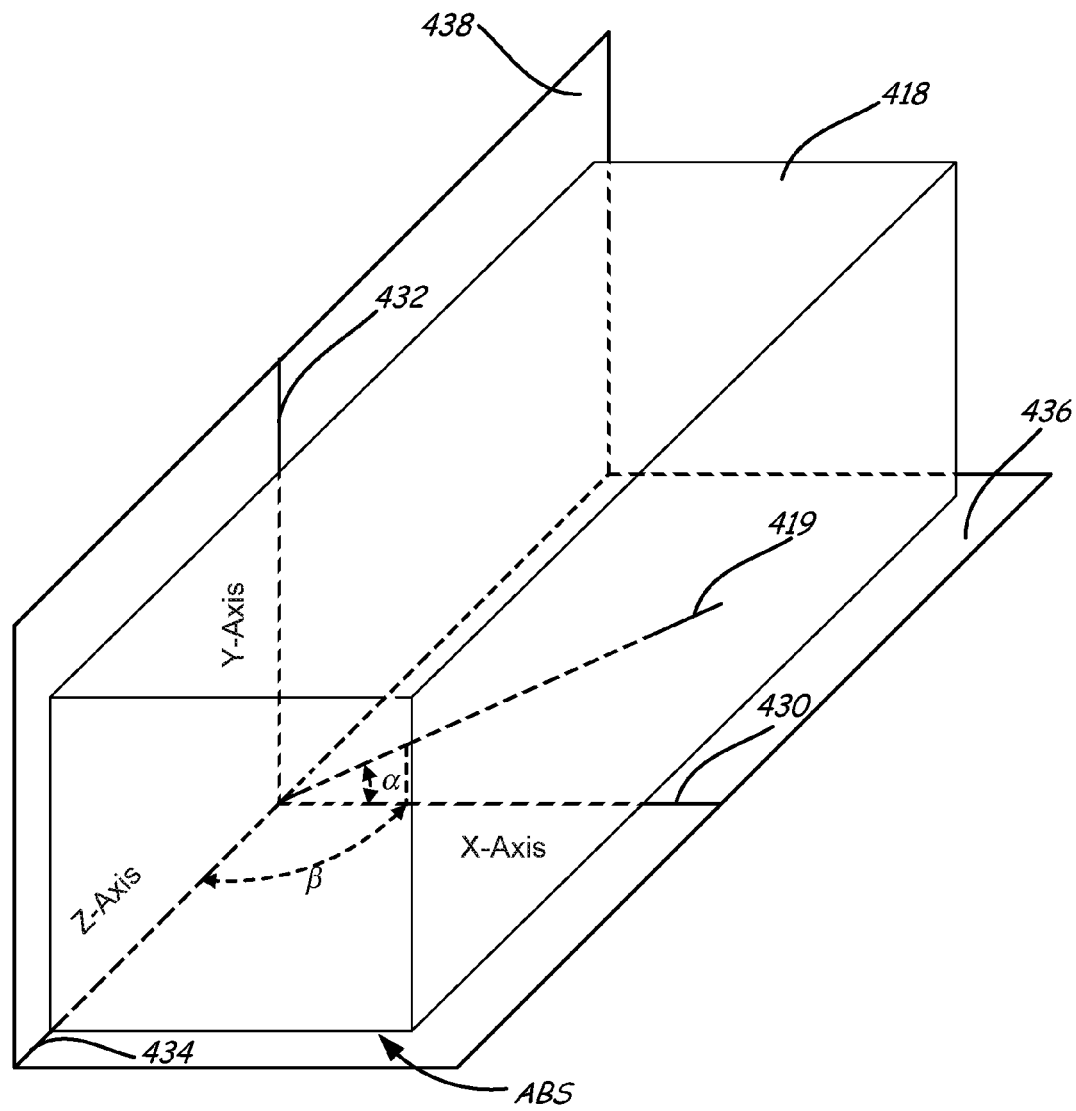

FIG. 4a is an oblique view of magnetic read head 400 with a cross section taken along a plane substantially normal to an ABS of magnetic read head 400. FIG. 4a also shows a cross-sectional view of a magnetic disc 301 taken along the plane substantially normal to the ABS of magnetic read head 400. Read head 400 includes first and second read shields 402 and 406 that each include a tilted magnetization layer 418, 420 closest to the reader stack 304. The tilted magnetization layer 418, 420 is tilted away from the ABS and towards the reader stack 304. In some embodiments, the tilt in magnetization of layer 418, 420 is between 30 and 60 degrees away from the ABS and towards the reader stack. In a particular embodiment, the tilt in magnetization of layer 418, 420 is 45 degrees away from the ABS and towards the reader stack 304. Each of shields 402 and 406 also includes a layer 422, 424, which is made of a material that is similar to the material used for conventional shields 302 and 306 in head 300 of FIG. 3. A magnetization direction or easy axis 303 of layer 422, 424 is along a same direction as the magnetization of conventional shields 302 and 306 in head 300 of FIG. 3. Easy axis 419 of tilted magnetization of layer 418 is better illustrated in FIG. 4b. FIG. 4b is an oblique view of magnetization layer 418. In FIG. 4b, X, Y and Z axes are denoted by reference numerals 430, 432 and 434, respectively. X and Z axes are also referred to herein as first and second horizontal axes, respectively, and the Y axis is also referred to herein as a vertical axis. Magnetization layer 418 is shown between XZ plane (first plane) 436, which is coplanar with the ABS, and ZY plane (second plane) 438 that is perpendicular to the ABS. Magnetization direction or easy axis 303 (not shown in FIG. 4b) of layers 422 and 424 (not shown in FIG. 4b) is in a direction of Z-axis 434 of FIG. 4b. However, the easy axis or magnetization direction 419 of layer 418 shown is FIG. 4b is tilted at an angle α from the X-axis 430 and at an angle β form the Z-axis 434. In some embodiments, angle α has a value between 30 and 60 degrees and β has a value of about 90 degrees. In a specific embodiment, angle α has a value of about 45 degrees and β has a value of about 90 degrees. In essence, the present embodiments involve forming magnetization layers that have an easy axis at an angle that promotes flux propagation away from the read sensor. The embodiments primarily involve tilting the magnetization of the shields near the ABS and near the reader.

Referring back to FIG. 4a, an easy axis 421 of magnetization layer 420 is tilted in a similar manner to easy axis 419 but in an opposing fashion, and the tilt of axis 421 can be a function of two angles that are similar to angles α and β shown in FIG. 4b. In the interest of simplification, no separate figure including only magnetization layer 420 is shown. The remaining elements shown in FIG. 4a are substantially similar to the elements of FIG. 3 and therefore no additional description has been provided for these elements.

As flux from a transition 314, 316 reaches the shield 402, 406 in the area of tilted magnetization layer 418, 420, the permeability in the direction perpendicular to axis M is maximized, and the flux propagates in that direction away from the reader stack 304. After passing through layers 418, 420, flux from transitions such as 314 and 316 may pass through layers 422 and 424, respectively, as shown in FIG. 4a, and may ultimately close in recording layer 308. Thus, no or minimal flux from the shields 402 and 406 reaches the reader stack 304. In such an embodiment, the distance between bits in the media becomes irrelevant since the effect is to remove the flux in the shields away from the reader stack 304.

In one embodiment, formation of magnetic read head 400 involves forming first read shield (402, for example) by forming a first read shield layer (422, for example) and forming a first one of the two tilted magnetization layers (418, for example) above, and in contact with, the first read shield layer 422. In this embodiment, formation of the tilted magnetization layer 418 involves depositing a material that inherently possesses a desired tilted magnetization direction. Reader stack 304 is then formed. This is followed by forming a second read shield (406, for example) by a process that is carried out in an opposite order to that of the formation of the first read shield 402. Examples of suitable materials for tilted magnetization layer 418, 420 are Cobalt Nickel Iron (CoNiFe) and Nickel Iron (NiFe). A suitable thickness 425 for tilted magnetization layer 418, 420 can be, for example, between 300 and 600 nanometers (nm).

In some embodiments, instead of using a material that inherently possesses a desired tilted magnetization direction, a permanent magnet that enforces the tilt in the magnetization direction of layer 418, 420 is used. FIG. 5a shows a cross-section of a read head 5001 that employs thin permanent magnet layers 502 and 504 with perpendicular magnetization to enforce the desired tilt in magnetization in layers 418 and 420. The permanent magnet layers with perpendicular magnetization enforce the desired tilt in the magnetization of layers 418 and 420. An example of a suitable permanent magnet material is Cobalt Platinum (CoPt).

In one embodiment, formation of magnetic read head 5001 involves forming a first read shield (402, for example) by forming a first read shield layer (422, for example), depositing a thin layer of permanent magnet (502, for example) with perpendicular magnetization on the first read shield layer (422, for example), and depositing a second read shield layer (418, for example) of the same material as the first read shield layer on the thin layer of permanent magnet (502, for example). Reader stack 304 is then formed. This is followed by forming a second read shield (406, for example) by a process that is carried out in an opposite order to that of the formation of the first read shield. Thicknesses of layers 502 and 418 are suitably selected to control a direction of magnetization in layer 418. A suitable thickness 503 for permanent magnet layer 502, 504 can be, for example, between 300 and 600 nm. Some embodiments involve patterning the thin layer of permanent magnet 502, 504 such that it is included only proximate the ABS. FIG. 5b (head 5002) shows a cross-sectional view of such an embodiment.

In other embodiments, materials that are not permanent magnets may be used to control a magnetization in the tilted magnetization layer 418, 420. FIGS. 6a and 6b (heads 6001 and 6002, respectively) are cross-sectional views that illustrate such embodiments. In these embodiments, formation of magnetic read head 6001, 6002 involves forming a first read shield (402, for example) by forming a first read shield layer (422, for example), depositing a thin layer of a non-magnetic material (602, for example) on the first read shield layer (422, for example), and depositing a second read shield layer (418, for example) of the same material as the first read shield layer on the thin layer of a non-magnetic material (602, for example). Reader stack 304 is then formed. This is followed by forming a second read shield (406, for example) by a process that is carried out in an opposite order to that of the formation of the first read shield. In one embodiment, thin non-magnetic layers 602 and 604 are formed of Aluminum Oxide ($Al_2O_3$). In a particular embodiment, the Aluminum Oxide layer 602, 604 has a thickness of 50 nanometers (nm). In some embodiments, layers 418 and 420 may be patterned as wedges (having a triangular cross-section) near the ABS and layers 602 and 604 may not be patterned as wedges. In some embodiments, layers 602, 604 may be patterned as wedges near the ABS and layers 418 and 420 may not be patterned as wedges. In other embodiments, which are not shown, neither layers 602 and 604 nor layers 418 and 420 are patterned as wedges. A width 603 of the wedge near the ABS is between 300 and 600 nm and a height 605 of the wedge is at least 300 nm and no greater than 600 nm. It should be noted that a planarization step could be use to minimize topography before the reader stack is processed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above sections and/or arrangement of paragraphs are provided for ease of reading only and, for example, do not limit one or more aspects of the disclosure discussed in a particular section with respect to a particular example and/or embodiment from being combined with, applied to, and/or utilized in another particular example, and/or embodiment which is described in another section. Elements, features and other aspects of one or more examples may be combined and/or interchangeable with elements, features and other aspects of one or more other examples described herein.

The above-disclosed subject matter is to be considered illustrative, and not restrictive, and the appended and/or issued claims are intended to cover all such modifications, enhancements, and other embodiments, which fall within the true spirit and scope of the present invention. Thus, to the maximum extent allowed by law, the scope of the present invention is to be determined by the broadest permissible interpretation of the appended and/or issued claims and their equivalents, and shall not be restricted or limited by the foregoing detailed description.

What is claimed is:

1. An apparatus comprising:
a first read shield and a second read shield; and
a reader stack between the first and second read shields;
wherein the first and second read shields each comprise a tilted magnetization layer closest to the reader stack with a tilt in an easy axis of magnetization at an angle $\alpha$ that is less than 90 degrees away from, and above, a bearing surface and towards a second plane that is orthogonal to the bearing surface and parallel to a plane between layers of the reader stack.

2. The apparatus of claim 1 wherein the first and second read shields each further comprise a permanent magnet layer with perpendicular magnetization adjacent to the tilted magnetization layer.

3. The apparatus of claim 2 and wherein the permanent magnet layer in the first read shield and the permanent magnet layer in the second read shield are only proximate to the bearing surface.

4. The apparatus of claim 1 wherein the angle $\alpha$ in each of the first and second read shields is between 30 and 60 degrees.

5. The apparatus of claim 4 wherein the bearing surface is coplanar with a first plane that is defined by a first horizontal axis and a second horizontal axis that is orthogonal to the first horizontal axis and is positioned along an intersection of the first plane and the second plane, and wherein the second plane includes a vertical axis that is orthogonal to the first horizontal axis and the second horizontal axis and passes through an intersection of the first horizontal axis and the second horizontal axis, and wherein the tilt in the easy axis of magnetization in the tilted magnetization layer in each of the first and second shields is further at an angle $\beta$ having a vertex at the intersection of the first horizontal axis, the second horizontal axis and the vertical axis, the angle $\beta$ is between 0 and 90 degrees from the first horizontal axis along the first plane.

6. The apparatus of claim 1 and wherein the angle $\alpha$ in each of the first and second read shields is about 45 degrees.

7. The apparatus of claim 1 wherein the tilted magnetization layer in each of the first and second read shields comprises a Cobalt Nickel Iron (CoNiFe) alloy or a Nickel Iron (NiFe) alloy.

8. The apparatus of claim 1 and further comprising an insulator spaced away from the bearing surface.

9. The apparatus of claim 1 wherein the tilted magnetization layer is wedge shaped.

10. The apparatus of claim 1 wherein the first and second read shields each comprise a wedge shaped insulator.

11. A magnetic head having a bearing surface, comprising:
a magnetoresistive read element;
first and second read shields, each positioned adjacent to, and on opposite sides of, the read element,
wherein at least a portion of the first and second read shields are magnetized in a direction that tilts an easy axis of magnetization in each of the at least the portion of the first and second read shields at an angle $\alpha$ that is less than 90 degrees away from, and above, the bearing surface and towards a plane that is orthogonal to the bearing surface and parallel to a plane between layers of the read element.

12. The magnetic head of claim 11 wherein each of the first and second read shields comprise a permanent magnet that enforces the tilt in the magnetization direction of the at least the potion of both the first and the second read shields.

13. The magnetic head of claim 11 wherein the angle $\alpha$ in each of the at least the potion of the first and the second read shields is between 30 and 60 degrees.

* * * * *

UNITED STATES PATENT AND TRADEMARK OFFICE
CERTIFICATE OF CORRECTION

| | | |
|---|---|---|
| PATENT NO. | : 8,422,177 B2 | Page 1 of 1 |
| APPLICATION NO. | : 12/771490 | |
| DATED | : April 16, 2013 | |
| INVENTOR(S) | : Juan Jose Fernandez-de-Castro | |

It is certified that error appears in the above-identified patent and that said Letters Patent is hereby corrected as shown below:

In the Claims

Column 8:

At line 22 (4th line of claim 12), delete "potion" and insert --portion--.

Column 8:

At line 24 (2nd line of claim 13), delete "potion" and insert --portion--.

Signed and Sealed this
Twentieth Day of January, 2015

Michelle K. Lee
*Deputy Director of the United States Patent and Trademark Office*